(12) United States Patent
Schie et al.

(10) Patent No.: US 11,604,996 B2
(45) Date of Patent: Mar. 14, 2023

(54) NEURAL NETWORK ERROR CONTOUR GENERATION CIRCUIT

(71) Applicants: David Schie, San Jose, CA (US);
Sergey Gaitukevich, San Jose, CA (US); Peter Drabos, San Jose, CA (US); Andreas Sibrai, San Jose, CA (US)

(72) Inventors: David Schie, San Jose, CA (US);
Sergey Gaitukevich, San Jose, CA (US); Peter Drabos, San Jose, CA (US); Andreas Sibrai, San Jose, CA (US)

(73) Assignee: AIStorm, Inc., Houston, TX (US)

( * ) Notice: Subject to any disclaimer, the term of this patent is extended or adjusted under 35 U.S.C. 154(b) by 927 days.

(21) Appl. No.: 16/396,583

(22) Filed: Apr. 26, 2019

(65) Prior Publication Data
US 2019/0332459 A1 Oct. 31, 2019

Related U.S. Application Data

(60) Provisional application No. 62/663,125, filed on Apr. 26, 2018.

(51) Int. Cl.
*G06N 3/06* (2006.01)
*G06N 3/08* (2006.01)
*G06N 3/084* (2023.01)
*G06N 3/063* (2023.01)
*G06N 3/04* (2023.01)

(52) U.S. Cl.
CPC .......... *G06N 3/084* (2013.01); *G06N 3/0481* (2013.01); *G06N 3/0635* (2013.01)

(58) Field of Classification Search
CPC ............................ G06N 3/0635; G06N 3/084
See application file for complete search history.

(56) References Cited

U.S. PATENT DOCUMENTS

| | | | |
|---|---|---|---|
| 5,052,043 A | 9/1991 | Gaborski | |
| 5,150,450 A | 9/1992 | Swenson et al. | |
| 5,222,193 A | 6/1993 | Brooks et al. | |
| 5,224,203 A | 6/1993 | Lo et al. | |
| 5,226,092 A | 7/1993 | Chen | |
| 5,479,579 A | 12/1995 | Duong et al. | |
| 5,640,494 A * | 6/1997 | Jabri | G06N 3/084 706/30 |
| 5,987,444 A | 11/1999 | Lo | |
| 2017/0011290 A1* | 1/2017 | Taha | G06N 3/0635 |
| 2017/0116512 A1* | 4/2017 | Kurokawa | G11C 11/24 |
| 2020/0143240 A1* | 5/2020 | Baker | G06N 3/04 |

OTHER PUBLICATIONS

Schaul, Tom, Ioannis Antonoglou, and David Silver. "Unit tests for stochastic optimization." arXiv preprint arXiv:1312.6055 (2013). (Year: 2013).*

(Continued)

*Primary Examiner* — Hal Schnee
(74) *Attorney, Agent, or Firm* — Jeffrey D. Moy; Weiss & Moy, PC

(57) ABSTRACT

A neural network learning mechanism has a device which perturbs analog neurons to measure an error which results from perturbations at different points within the neural network and modifies weights and biases to converge to a target.

10 Claims, 23 Drawing Sheets

(56) References Cited

OTHER PUBLICATIONS

Maliuk, Dzmitry, Haralampos-G. Stratigopoulos, and Yiorgos Makris. "An analog VLSI multilayer perceptron and its application towards built-in self-test in analog circuits." 2010 IEEE 16th International On-Line Testing Symposium. IEEE, 2010. (Year: 2010).*

Flower, Barry, and Marwan Jabri. "Summed weight neuron perturbation: An O (n) improvement over weight perturbation." Advances in neural information processing systems 5 (1992). (Year: 1992).*

* cited by examiner

Summary: the equations of backpropagation

$$\delta^L = \nabla_a C \odot \sigma'(z^L) \quad \text{(BP1)}$$

$$\delta^l = ((w^{l+1})^T \delta^{l+1}) \odot \sigma'(z^l) \quad \text{(BP2)}$$

$$\frac{\partial C}{\partial b_j^l} = \delta_j^l \quad \text{(BP3)}$$

$$\frac{\partial C}{\partial w_{jk}^l} = a_k^{l-1} \delta_j^l \quad \text{(BP4)}$$

Figure 10

$$C = \frac{1}{2n} \sum_x \|y(x) - a^L(x)\|^2$$

Figure 11

$$\delta^L = \nabla_a C \odot \sigma'(z^L)$$

$$\nabla_a C = (a^L - y)$$

Figure 12

$$\delta^L = \nabla_a C \odot \sigma'(z^L)$$

$$\nabla_a C = (a^L - y)$$

$$\delta_1^3 = (a_1^3 - y_1)\sigma'(z_1^3)$$

Figure 15

NEURAL NETWORK ERROR CONTOUR GENERATION CIRCUIT

RELATED APPLICATIONS

This patent application is related to U.S. Provisional Application No. 62/663,125 filed Apr. 26, 2018, entitled "ANALOG LEARNING ENGINE" in the name of David Schie, and which is incorporated herein by reference in its entirety. The present patent application claims the benefit under 35 U.S.C. § 119(e).

TECHNICAL FIELD

The present invention generally relates to an analog mathematical computing device and, more particularly to, a device which is capable of performing machine based learning.

BACKGROUND

Machine learning is an application of artificial intelligence (AI) that provides systems the ability to automatically learn and improve from experience without being explicitly programmed. Machine learning focuses on the development of systems that can access data and use it learn for themselves.

Digital machine learning is a cumbersome process as the number of neurons in a neural network can be large and the calculation of derivatives and weight adjustments required to follow an error contour may represent an enormous number of calculations. The calculation of derivatives is difficult for digital systems and the generation of an error contour which requires the calculation of a chain of derivatives to develop the error contour can take significant time and mathematical computing power.

Therefore, it would be desirable to provide a system and method that overcome the above problems.

SUMMARY

In accordance with one embodiment, a neural network error contour generation mechanism is disclosed. The neural network error contour generation mechanism has a device which perturbs weights & biases associated with analog neurons to measure an error which results from perturbations at different points within the neural network.

In accordance with one embodiment, a backpropagation mechanism is disclosed. The backpropagation mechanism has a neural network error contour generation mechanism comprising a device which perturbs weights & biases associated with analog neurons to measure an error which results from perturbations at different points within the neural network. A set of m mini-batches of n training samples are inputted to the neural network error contour generation mechanism, wherein n is the number of training examples and m the number of mini-batches of training examples. In one type of machine learning, each weight and/or bias in the neural network may be modified according to an average of an error function multiplied by the derivatives of local activation to move towards a target.

In accordance with one embodiment, a backpropagation mechanism is disclosed. The backpropagation mechanism has an error contour comprising a change in a neural network resulting from perturbation of each weighted sum. A set of m mini-batches of n training samples are inputted to the neural network error contour generation mechanism, wherein n is the number of training examples and m the number of mini-batches of training examples. Each weight in the neural network is modified according to an average of an error function multiplied by information related to its local activation to move towards a target.

In accordance with one embodiment, a weight tuning circuit is disclosed. The weight tuning circuit has one of a gated current or charge input representing an input value to match. A ΣΔ modulator using two switched charge reservoirs in inverter configuration is provided (i.e. an integrator with gain coupled to a switch charge reference). An output of the ΣΔ modulator adjusts current sources feeding a node (which controls a weight current) between the two switched charge reservoirs against a comparator reference voltage to increase accuracy using oversampling.

In accordance with one embodiment, a weight tuning circuit is disclosed. The weight tuning circuit has one of a gated current or charge input representing an input value to match. A ΣΔ modulator using two switched charge reservoirs in inverter configuration. A current representing a weight is subtracted from a node between the two switched charge reservoirs. A resulting integrated value is compared to a comparator reference to generate an average accurate value over multiple cycles.

In accordance with one embodiment a charge domain implementation of the four equations of backpropagation is implemented. The weights and biases are adjusted according to calculations made in the charge domain utilizing charge domain multipliers and memory storage devices.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

FIG. 10 shows an exemplary embodiment of equations used for backpropagation in accordance with one aspect of the present application;

FIG. 11 shows an exemplary embodiment of an equation used for cost function in accordance with one aspect of the present application;

FIG. 12 shows an exemplary embodiment of equations used for error calculations in accordance with one aspect of the present application;

FIG. 15 shows an exemplary embodiment of equations used to develop an output layer error contour in accordance with one aspect of the present application;

DESCRIPTION OF THE APPLICATION

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Figure 1:
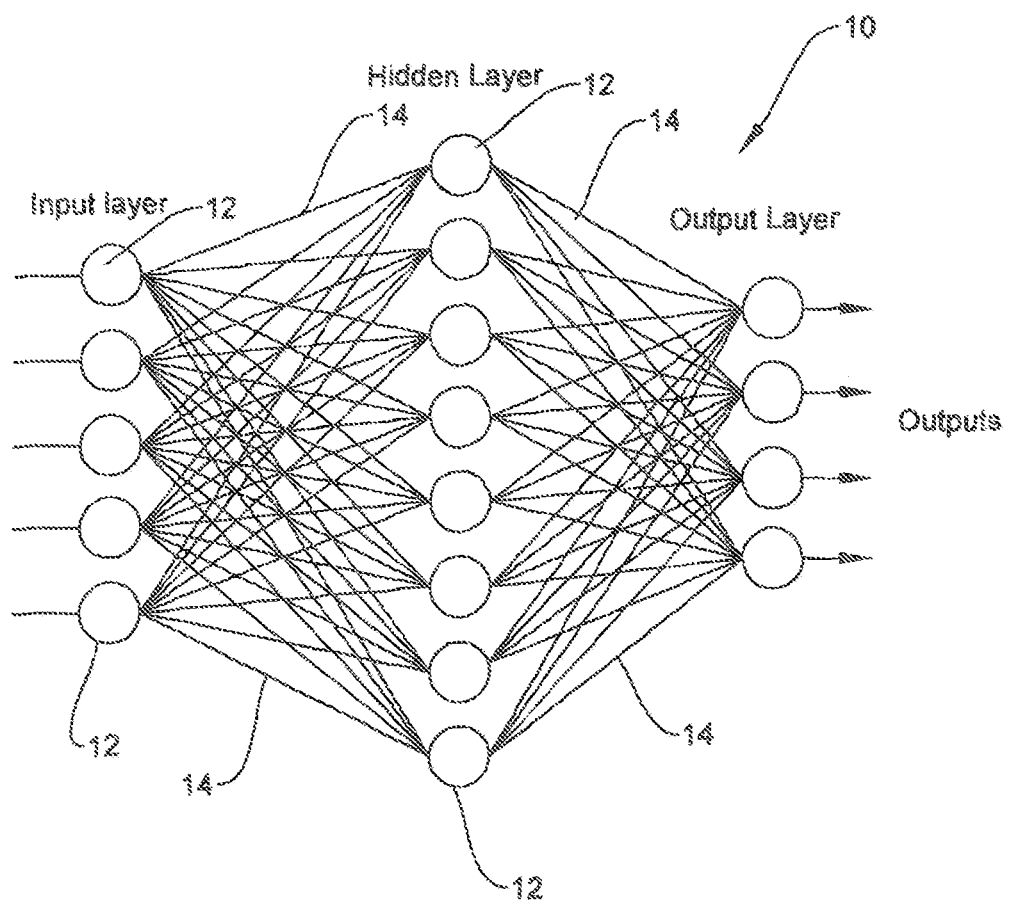
FIG. 1 is a block diagram showing an exemplary embodiment of a neural network architecture that relies upon a multiplier within each connection in accordance with one aspect of the present application.

Referring to FIG. 1, a neural network 10 may be seen. In the neural network 10, the circles 12 are neurons having input data. The lines 14 are multipliers which multiply the input data by a weight (w). The result may be fed to a decision circuit or to subsequent layers and that output in turn fed to the next layer. As each neuron, containing a summer of the weighted inputs and in some cases a decision circuit, may be connected to many neurons in the following layers, therefore the number of weights can be very large. Although a simple view of the neural network is shown in FIG. 1, functions such as pooling (decimation), expansion, decisions, convolution and other functions may be constructed from these basic elements using the same or related techniques.

Figure 2:
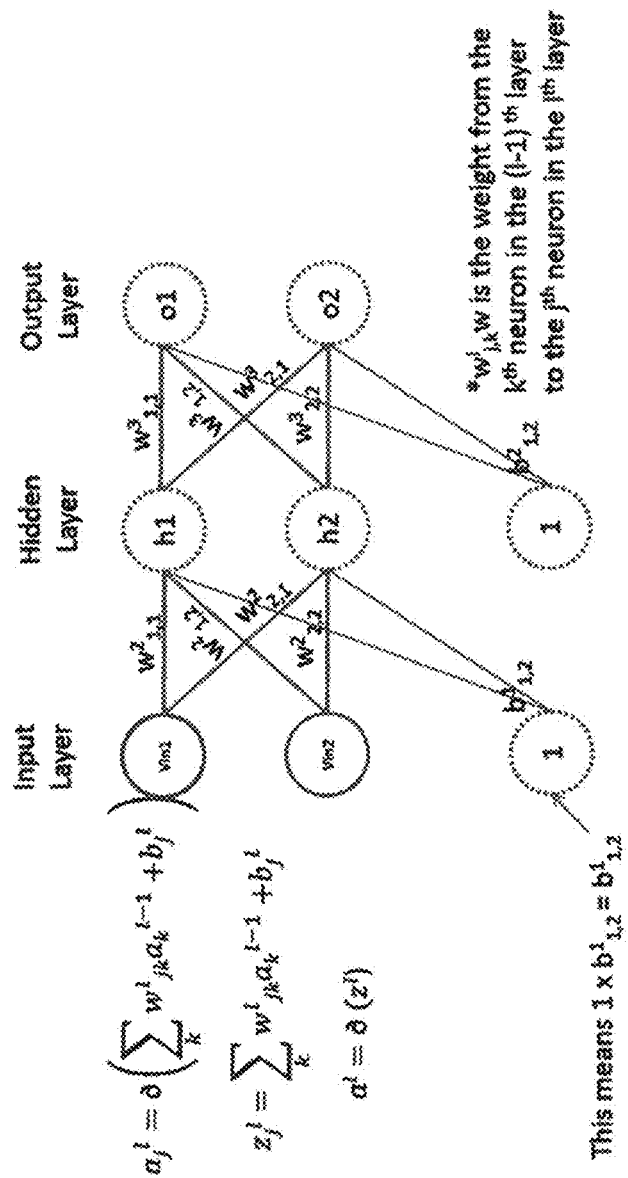
FIG. 2 is block diagram showing an exemplary embodiment of details of the neural network architecture of FIG. 1 in accordance with one aspect of the present application.
Figure 3:
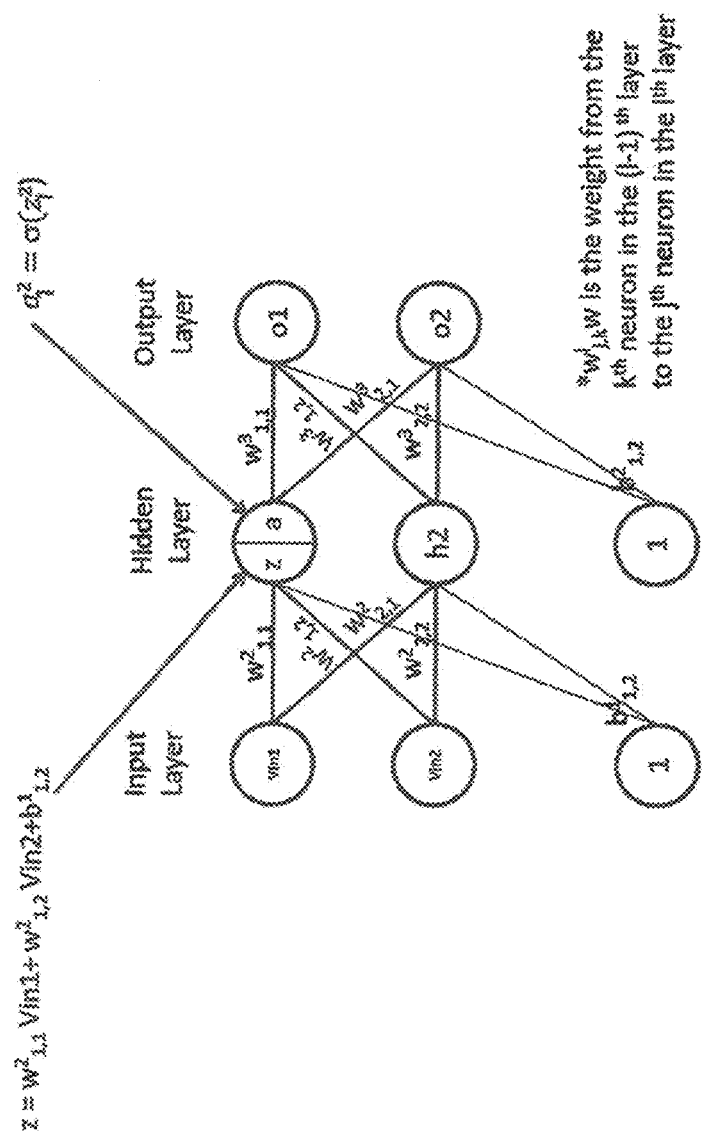
FIG. 3 is block diagram showing an exemplary embodiment of details of the neural network architecture of FIG. 1 in accordance with one aspect of the present application.

FIGS. 2 and 3 shows additional details of the neural network 10 (FIG. 1). For a given neuron there are multiple inputs from a previous layer, except for the input layer where the input comes from an external source. The output of each layer is the activation, a. For a given neuron each of the activations from a previous neuron are multiplied by a weight, modified by a fixed bias (if any) and the result, z, is fed to a decision circuit to create the activation for the next stage.

Figure 4:
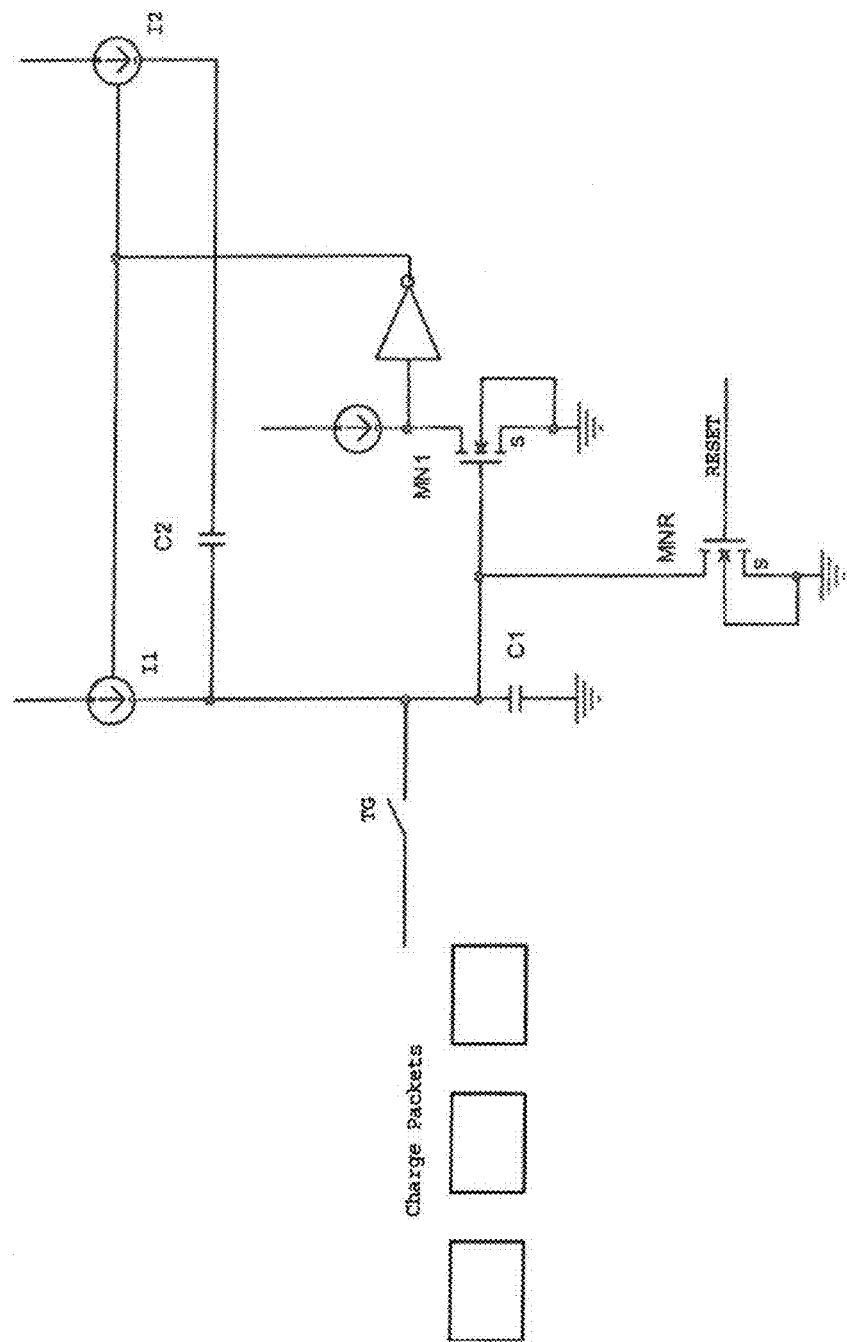
FIG. 4 is a block diagram showing an exemplary embodiment of an analog multiplier cell in accordance with one aspect of the present application.
Figure 5:
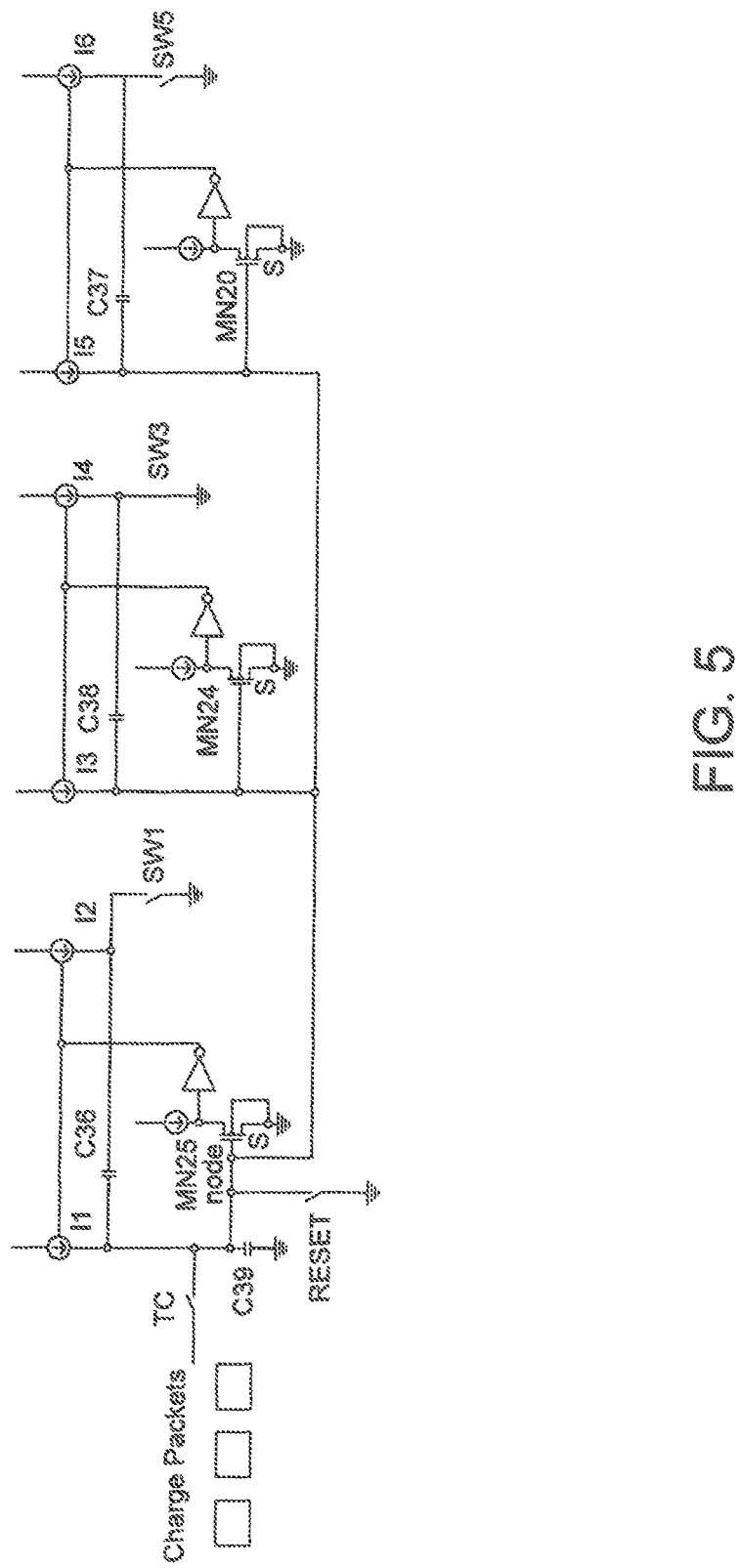
FIG. 5 is a block diagram showing an exemplary embodiment of a multiply and accumulate circuit in accordance with one aspect of the present application.
Figure 5A:
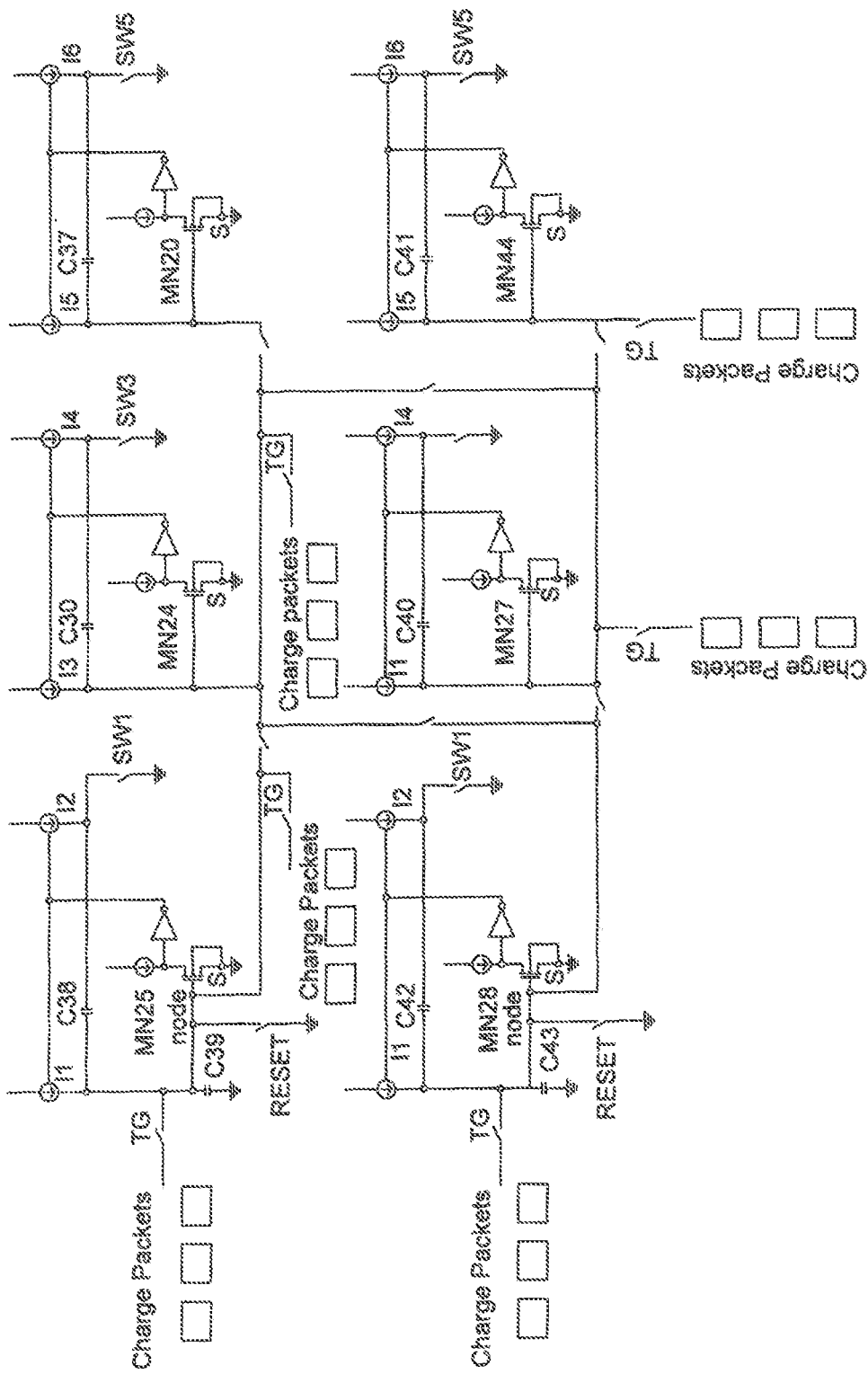
FIG. 5A is a block diagram showing an exemplary embodiment of a systolic multiply and accumulate circuit in accordance with one aspect of the present application.
Figure 6:
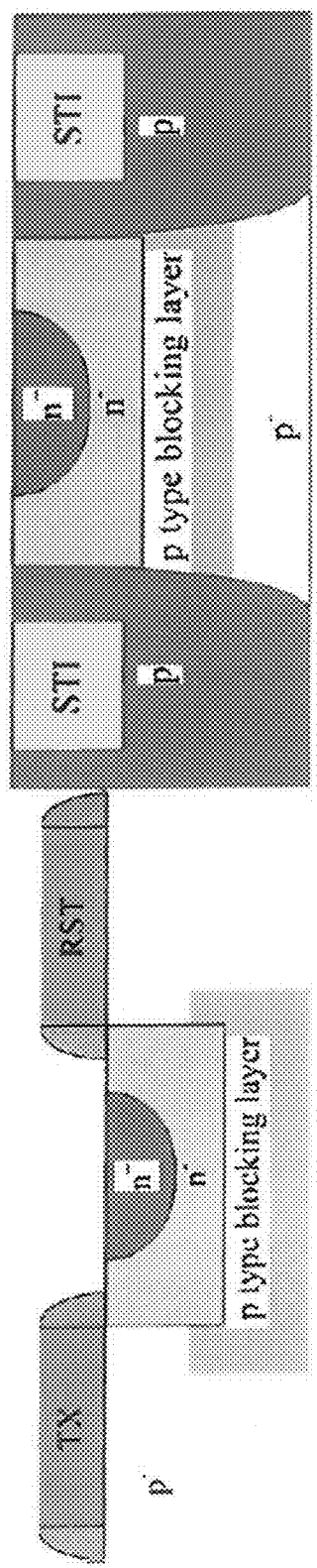
FIG. 6 depicts an exemplary embodiment of a depleted junction with minimized junction overlap capacitance in accordance with one aspect of the present application.

A neural network operates on mathematics and as such can be implemented in a number of ways. There are therefore many competing ways to implement a neural network. In general, the different methods focus upon optimizing the movement of information, and on the performance and efficiency of the multiplication. One option for a neural network multiplier is an analog multiplier based upon a switched charge approach such as that shown in FIG. 4 and disclosed in co-pending application having a Ser. No. 16/291,311, a filing date of Mar. 4, 2019 and which is incorporated in its entirety herewith. This multiplier may be extended to a serial multiplier and summer such as the one shown in FIG. 5 or may be extended to a parallel/serial systolic summer which can multiply and sum multiple operands simultaneously and implement systolic functions as shown in FIG. 5A disclosed in co-pending application filed concurrently herewith, in the name of the same inventor as the present application and incorporated in its entirety herewith. The capacitors used in these multipliers may be made extremely small through the use of depleted junction transfer gates as illustrated in FIG. 6 disclosed in co-pending application having a Ser. No. 16/291,311, a filing date of Mar. 4, 2019 and which is incorporated in its entirety herewith.

Figure 7:
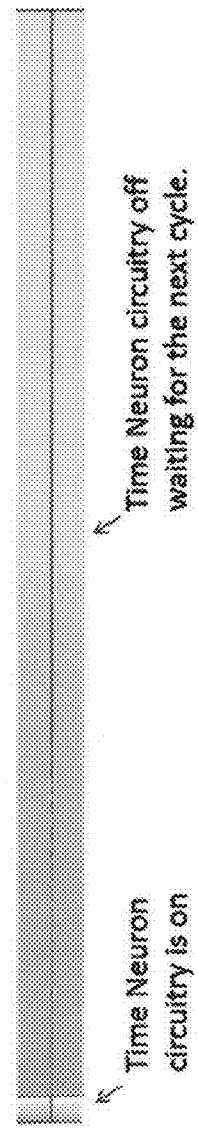
FIG. 7 depicts an exemplary embodiment of a time view of a neuron network cycle in accordance with one aspect of the present application.

The analog multipliers described above operate very quickly. FIG. 7 illustrates that during a given cycle, the multipliers and other neuron circuitry are active only for a very short portion of the cycle. During the rest of the cycle the circuitry may be re-used for learning or be off, while returning to execution during the required portions of the cycle. This is a particularly useful aspect of the analog switched charge implementation of a neural network.

Figure 8:
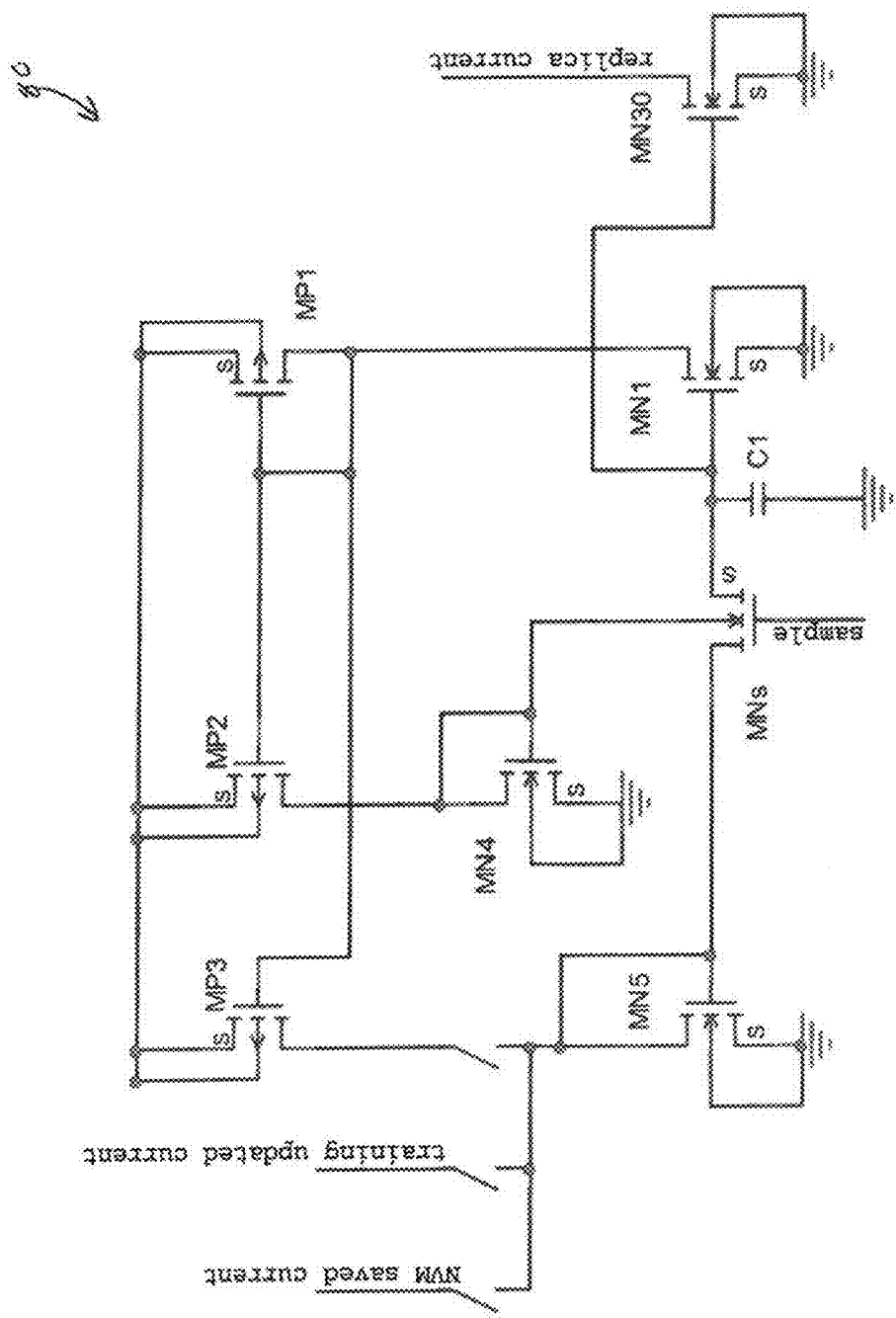
FIG. 8 is a block diagram showing an exemplary embodiment of a short-term memory cell in accordance with one aspect of the present application.

To utilize circuitry during the off time it may be necessary to save current information. To do this, a short term memory cell 80 may be used as shown in FIG. 8. This short term memory cell 80 might retain at least 8-bit accuracy for 10's of ms to 1000's of ms depending upon process and leakage. The short term memory cell 80 may accept currents and temporarily stores their value.

For example, an existing value could be introduced with the switch in series with "training updated current" switched on. Assuming the sample and hold transistor MNs is on, the current will be mirrored through the mirror pair MN5/MN1 and MN30. MN1 will send this current to MP1 which will mirror it to MP2 and finally it will flow through the diode connected MP4. MP1 also mirrors the information to MP3. Now we can open the "training updated current" switch and close the switch in series with MP3. This will equalize all the junctions on MNs such that the leakage current will be extremely small. Now we can open MNs and the Vgs required to maintain the stored voltage will be stored upon the gate capacitor C1 which could be the parasitic capacitance of MN1. This circuitry may be replaced with charge domain circuitry such that MNs is an optimized charge domain transfer gate.

Figure 9:
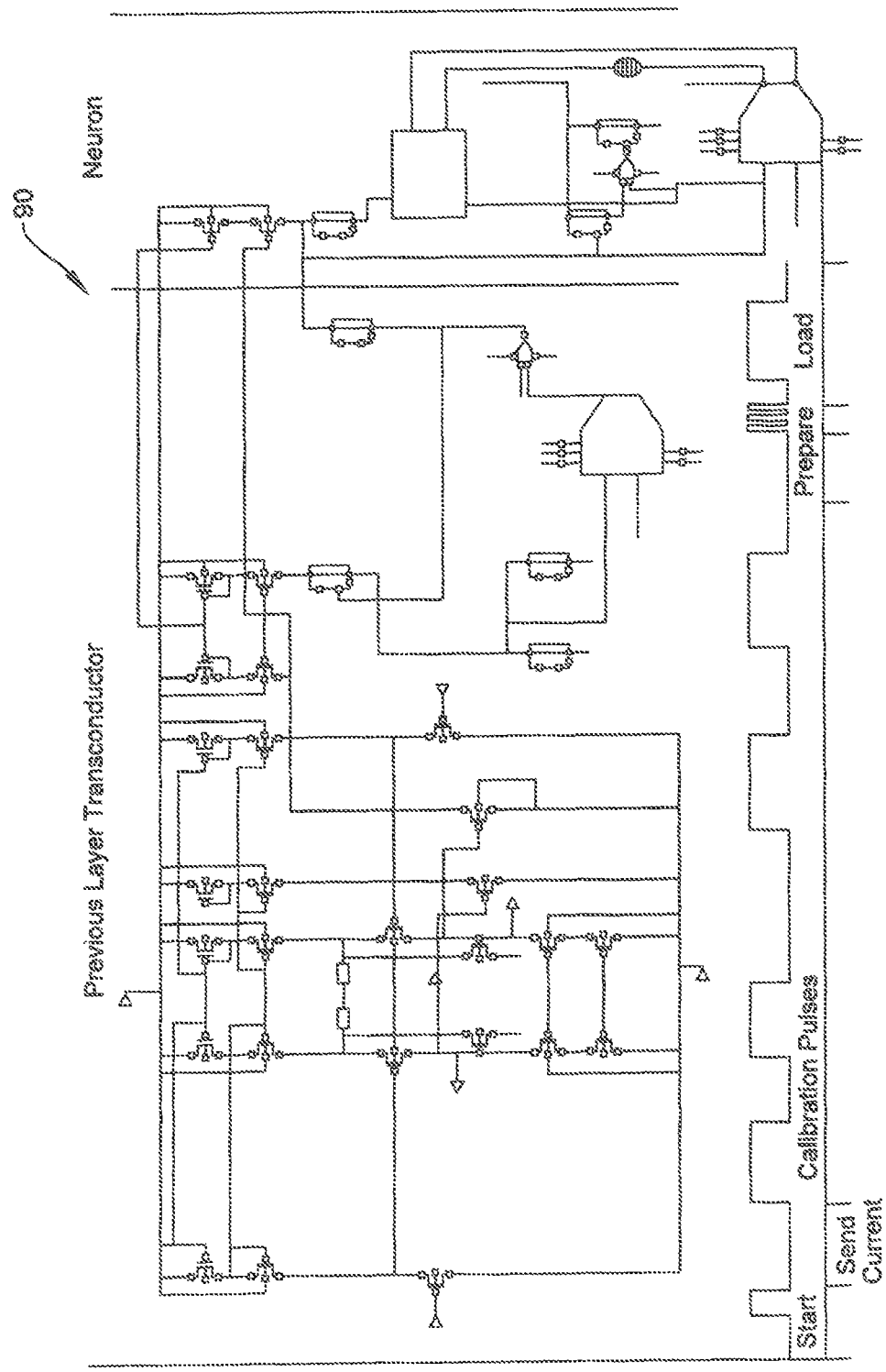
FIG. 9 is a block diagram showing an exemplary embodiment of a decision circuit in accordance with one aspect of the present application.

Now that we have a means by which to store information, we need a decision circuit which provides activations as current information. One way to translate the activations to current is through the decision circuit. FIG. 9 shows a four quadrant transconductor 90 that could be used as such a decision circuit, accepting voltage input and outputting current which can be integrated by the next input stage. This four quadrant transconductor 90 also is compatible with time based charge transfer which can be normalized for errors. The four quadrant transconductor 90 can implement multiple functions such as sigmoid, ReLU or ramp. Those skilled in the art will understand that a current based storage such as that shown is only one way by which information might be stored temporarily and by which information might be transferred between neuron stages.

FIG. 10 shows an example of a learning algorithm, backpropagation. Backpropagation is a method used in AI networks to calculate a gradient that is needed in the calculation of the weights and biases to be used in the AI network. Backpropagation is shorthand for "the backward propagation of errors," since an error is computed at the output and distributed backwards throughout the network's layers. It is commonly used to train deep neural networks.

FIG. 11 illustrates a cost function. A cost function measures whether we are converging to a target y(x) or diverging so that we can decide whether to keep adjusting weights in a given direction or not. In this case the quadratic cost function is measuring the square of the difference between a target and the output of the neural network for a given training example x and averaging these over n training examples.

Figure 12:
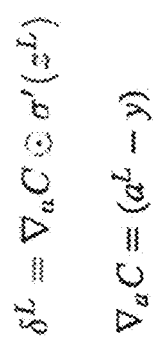

Choosing the quadratic function allows one to simplify the error function as shown in FIG. 12. The curl of the cost function becomes simply the difference between the neural network activation output and the target. BP2 (FIG. 10) illustrates how we can create the remainder of the error function using the chain rule. In other words, one can calculate the error of the previous layer by moving the error backwards through the network. Eventually one may end up with an error contour according to BP4 (FIG. 10) which allows one to express the rate of change of the cost function against the change in the weight of the weight connecting the jth neuron of the lth layer to the kth neuron of the 1-lth layer.

Propagating this error backwards through the network, one can calculate the error function of previous layers. For example we can calculate the error caused by the first neuron in the second layer $\delta_1^2$ by multiplying $\delta_1^3$ by $\sigma'(z_1^2)*w^3_{11}$.

The general way to perform backpropagation training of the neural network is usually described as follows:
1. Input a set of training examples.
2. For each training example x, set the corresponding input activation vector $a^{x,1}$, and perform the following steps (note these equations manipulate matrices):

a. Feedforward: For each l=2, 3, ... L, compute $z^{x,l}=w^l a^{x,l-1}+b^l$ and $a^{x,l}=\sigma(z^{x,l})$
    b. Output error $\delta^{x,L}$: Compute the vector $\delta^{x,L}=\nabla_a C_x \odot \sigma'(z^{x,L})$
    c. Backpropagate the error: For each l=L-1, L-2, ... 2 compute $\delta^{x,l}=((w^{l+1})^T \delta^{x,l+1}) \odot \sigma'(z^{x,l})$
3. Gradient Descent: For each l=L, L-1, ... , 2 update the weights according to the rule $$w^l \rightarrow w^l - \frac{n}{m}\sum_x (\delta^{x,l} a^{x,l-1})^T$$

and the biases according to the rule $$b^l \rightarrow b^l - \frac{n}{m}\sum_x \delta^{x,l}$$

Where n is the number of training examples and m the number of mini-batches of training examples.

In a digital system, one would literally need to perform the derivations and multiplies to generate this error contour. This takes a significant amount of computing power due to the large number of multiplies and derivatives involved. In the switched charge system, it is much easier to generate the error contour as one can generate derivatives by actually perturbing.

Perturbation theory is a mathematical method for finding an approximate solution to a problem, by starting from the exact solution of a related, simpler problem. A critical feature of the technique is a middle step that breaks the problem into "solvable" and "perturbation" parts. Perturbation theory is applicable if the problem at hand cannot be solved exactly, but can be formulated by adding a "small" term to the mathematical description of the exactly solvable problem.

Figure 13:
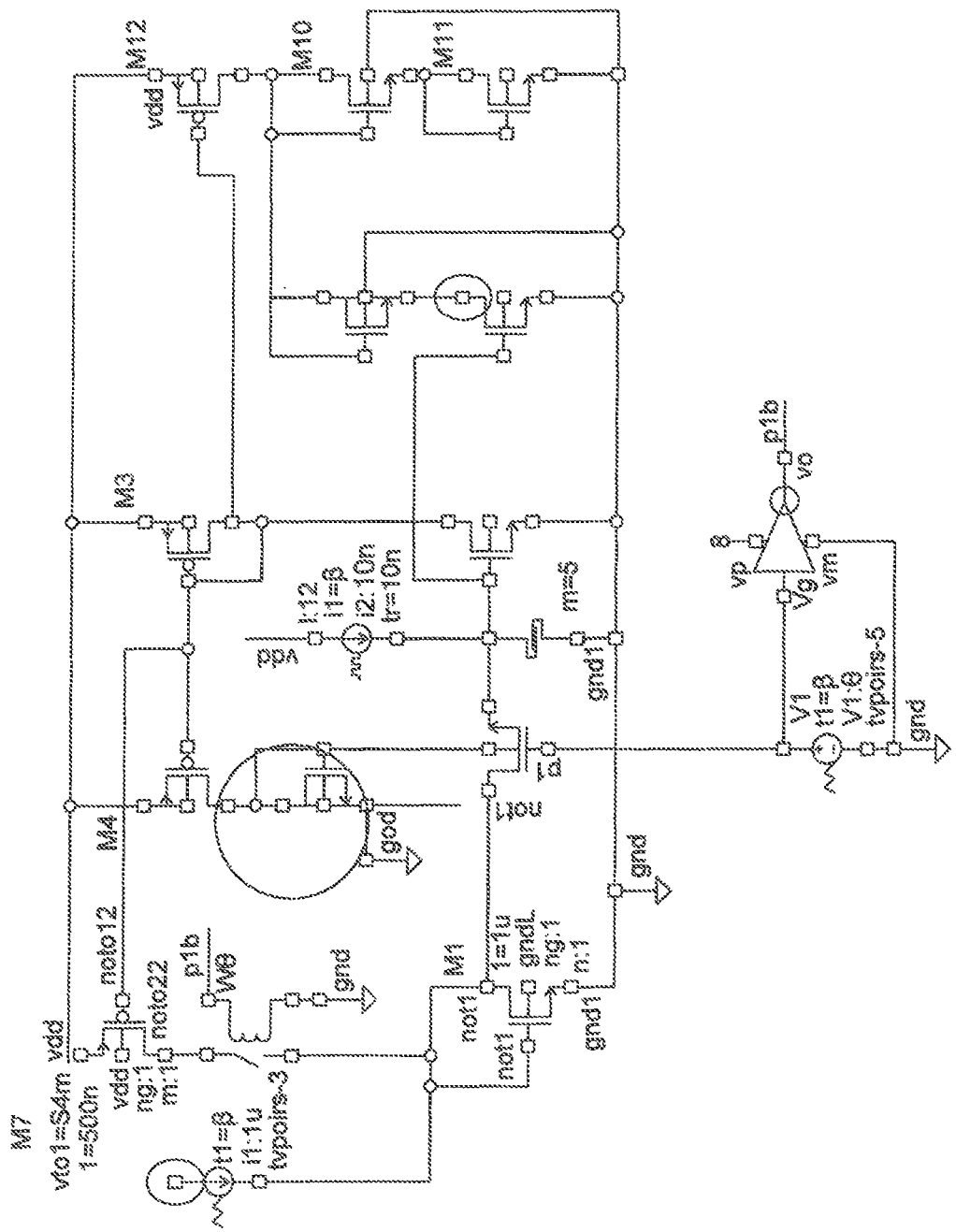
FIG. 13 is a block diagram showing an exemplary embodiment of a short term memory cell with pulse adjustment in accordance with one aspect of the present application.
Figure 14:
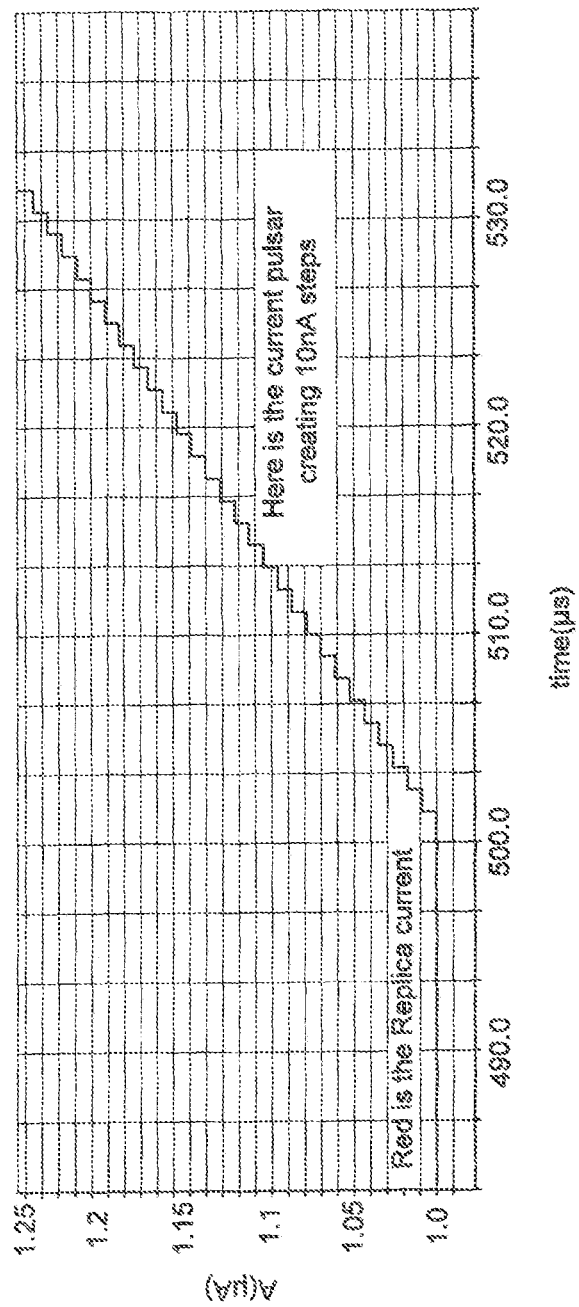
FIG. 14 is a timing diagram showing an exemplary embodiment of a short term memory cell output having its control register and therefore magnitude increased by positive pulses in accordance with one aspect of the present application.

In the multipliers shown, weights are provided as a ratio of the currents. Assuming one has stored the weights temporarily in the short term memory cell 80 shown in FIG. 8, one can show that the value of the current may be adjusted slightly by modifying the voltage stored on C1 slightly. One can do this by adding or subtracting a current pulse with a current source as shown in FIG. 13. FIG. 14 shows the output current stepping up with repeated pulses. The change may also be created by capacitively coupling a voltage pulse to C1.

Figure 16:
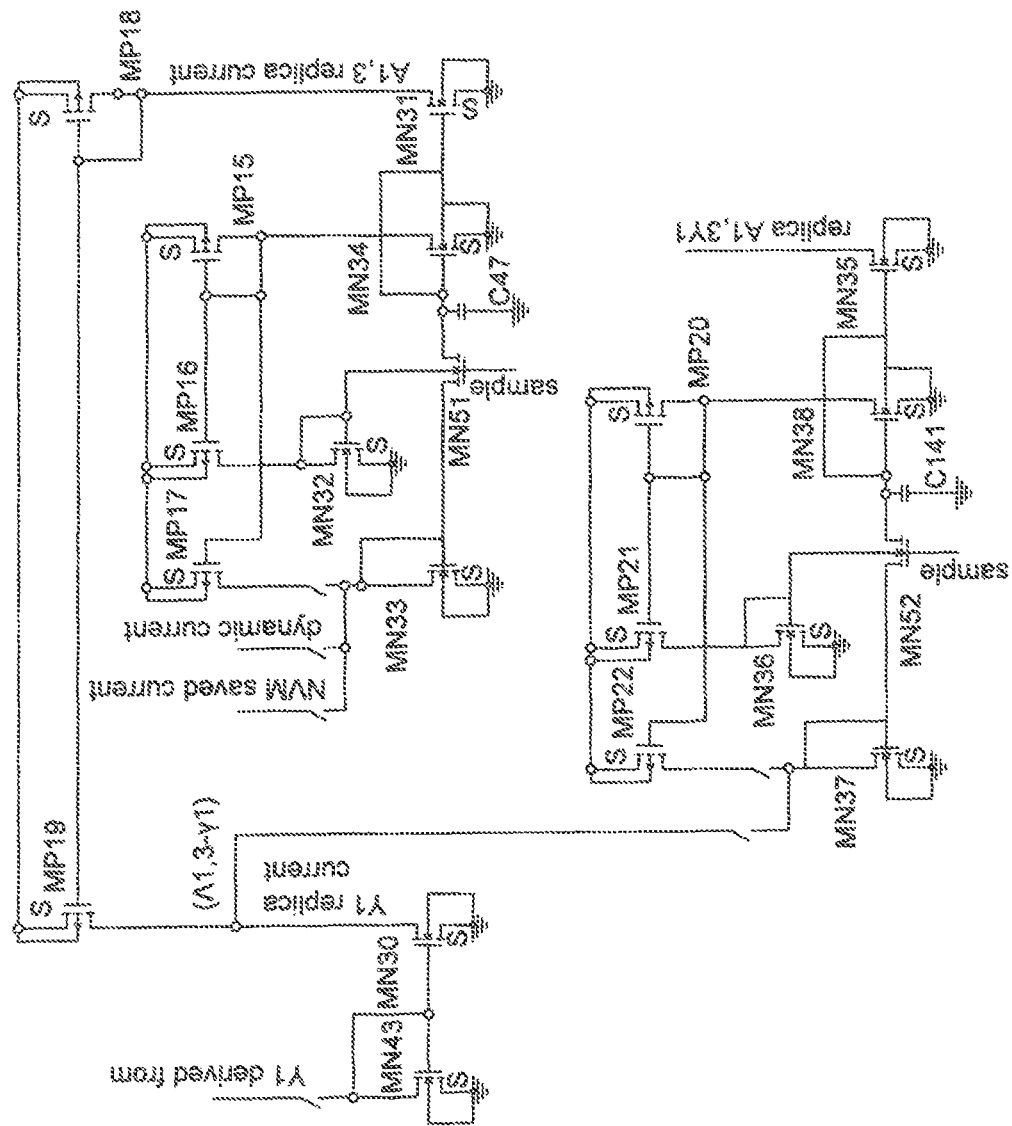
FIG. 16 is a block diagram showing an exemplary embodiment of a circuit for generating a curl of cost function in accordance with one aspect of the present application.
Figure 17:
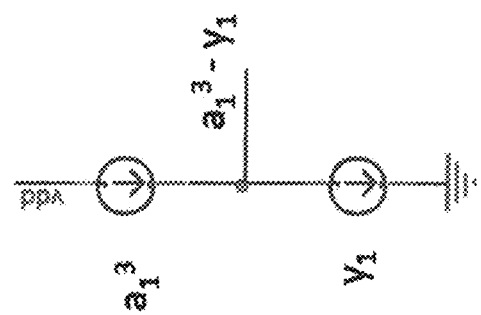
FIG. 17 is a block diagram showing an exemplary embodiment of a circuit for generation of σ'(z) and (a-y) in accordance with one aspect of the present application.
Figure 17:
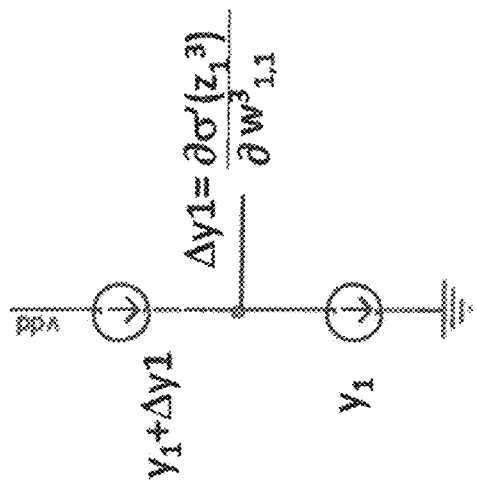

One can now explain how one can perform the equations of backpropagation using analog current mode mathematics. FIG. 15 shows the math that one may have to perform for the calculation of the output layer error function. Analog calculation of this math is shown in FIGS. 16 & 17. One may use the short term memory cell 80 to sample and hold the change in $y_1$ that results adding a small perturbation at the input to $z_1^3$. This can be accomplished by summing in an additional current source which is pulsed for a short period of time into the neuron summer input capacitor (and removing it again or reloading it from "training updated current" after learning use to be ready for the next calculation) in another short term memory cell 80 and store that delta $\sigma'(z_1^3)$ in a memory cell. Similarly, assuming that the targets are saved as currents we can subtract the target $y_1$ from the final activation $a_1^3$ as shown in FIG. 16 assuming we saved it in a memory cell after the forward propagation. We can now use a multiplier to generate $\delta_1^3$, $\delta_1^3=(a_1^3-y_1)\sigma'(z_1^3)$, and then use the transconductor 90 (FIG. 9) to convert it into a current, and save it in a memory cell.

One can similarly perturb the previous layer to find $\sigma'(z_1^2)$ and $\delta_1^2$. FIG. 16 shows how one might use the memory cells and current mode mathematics to generate and sample and hold the derivative of the cost function and store the result in our memory cell. One can work backwards to generate the error contour per 2 c. and store it in the short term memory cell 80. One can repeat this for a given training set x, over a number of training examples n, in a number of mini-batches m and then modify the weights according to 3 by using the multiplier shown in FIG. 4. Recall that if current is subtracted from our summing node then one multiplies, if it is added one divides. One can also apply normalizations with additional stages or by scaling at the same time.

The above discloses the use of analog mathematics to accelerate the learning process. Due to the perturbations and minimization of the number of multiplies and derivatives, one can dramatically increase the speed and reduce the power required for training.

Figure 22:
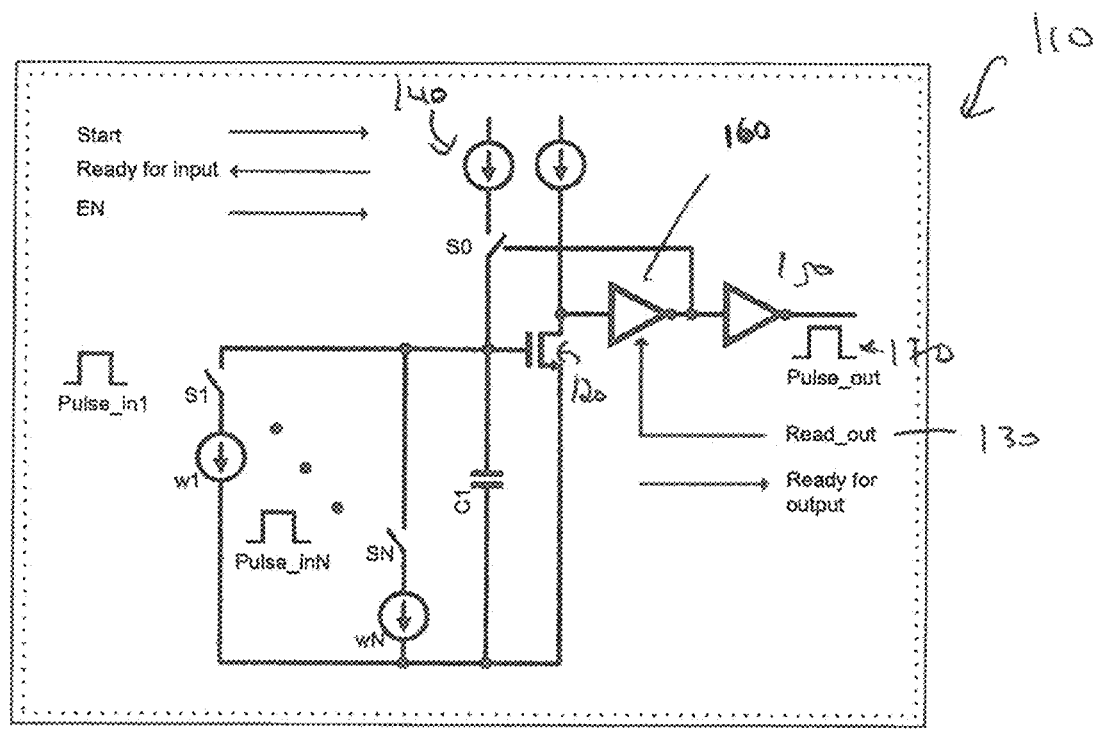
FIG. 22 is a charge mode multiply and add circuit or "memory cell" which may be used to temporarily store one or more charges or to perform addition or to temporarily store information for later distribution.

As an alternative to current mode mathematics a charge domain mechanism is presented. In FIG. 22 the concept of the charge domain mathematics is shown as 110. Initially, the trip point of the common source comparator has been stored on the gate by pulling the gate node below its trip point (with read_out enabled but not pulse_out), releasing it, and allowing current source 140 to charge it up until said current source is turned off by the switching of said common source comparator. Thereafter, the drain of the MOSFET 120 is held low by the low side switch of the first inverter 160 which is coupled to the signal Read_out 130. The output of the second inverter 150 is also disabled until requested by a signal "pulse_out" 170. One or more current sources, proportional to current source 140, are coupled to the gate of said MOSFET through switches further coupled to input pulses. The width of each of said pulses represents an input value and the magnitude of the current source represents a weight. The pulse gating said current source weights results in a multiplication of weight×input time which reduces the voltage on the gate of said MOSFET by a voltage of C/Q where C is the total capacitance on said gate node and Q is the total charge removed from said node. The accumulated charge from said one or more weighted inputs is replaced when the "Read_out" circuit 130 enables the circuit and simultaneously a pulse is initiated by enabling "pulse_out". "pulse_out" will end when the gate of the comparator returns to its trip point and turns off current source 140.

Figure 23:
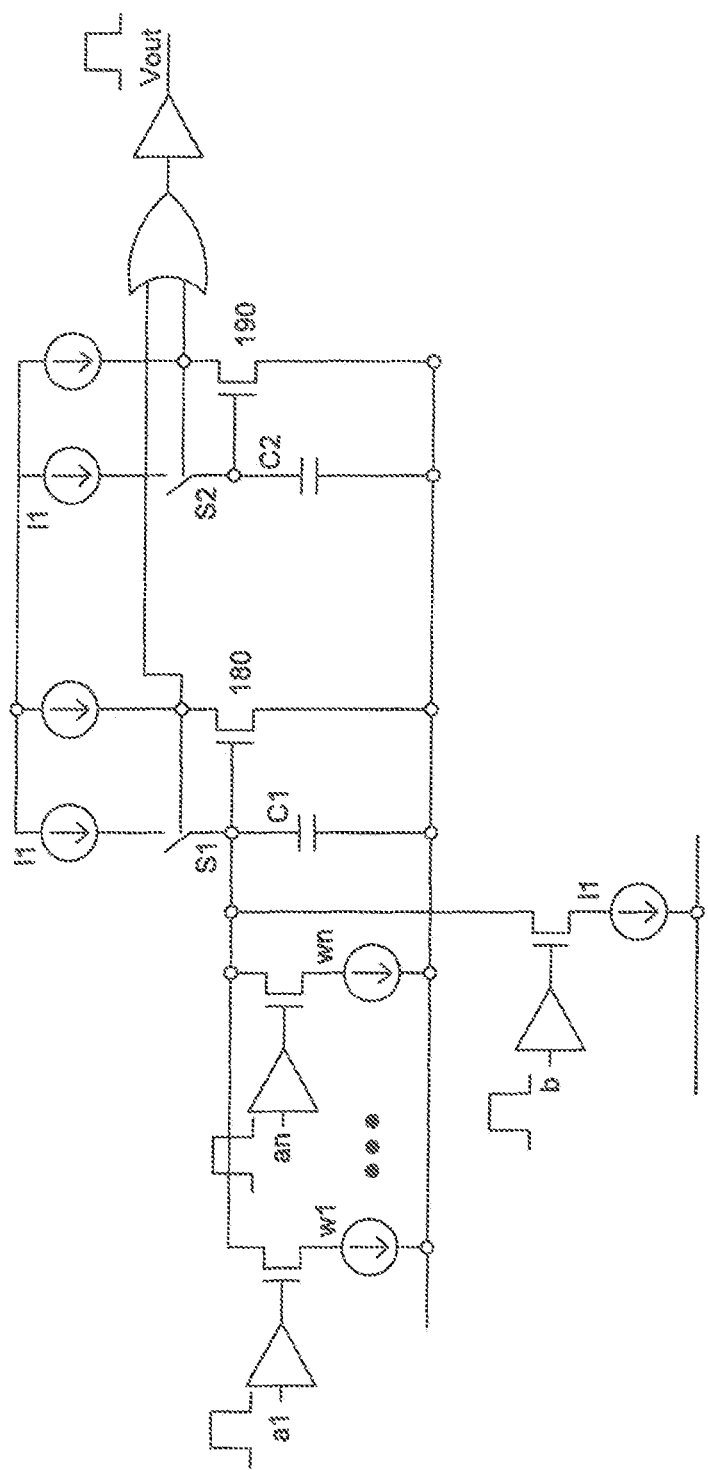
FIG. 23 is an example of a multiple input multiply and add circuit accepting pulse inputs, current source weights and further incorporating a ReLU decision circuit.

In FIG. 23 this concept is extended to add a bias input, which works in a similar manner to the weighted current sources except the current source is of the same magnitude as 140. The devices connected to the MOSFET gates are drivers not inverters. Also shown is some additional charge domain mathematics. In this case it is a ReLU decision circuit. The circuit works by ORing the pulse produced by the switching of the common source comparator 180 and the output of a second common source comparator 190 previously loaded to 50% of the dynamic range of the circuit. By ORing the pulse output of the weighted input summer with a 50% pulse, we are ensured at least a 50% pulse but if the pulse exceeds 50% then the pulse will be the linear value of the multiply & add circuit (weighted summer) which is the definition of a ReLU.

Figure 24:
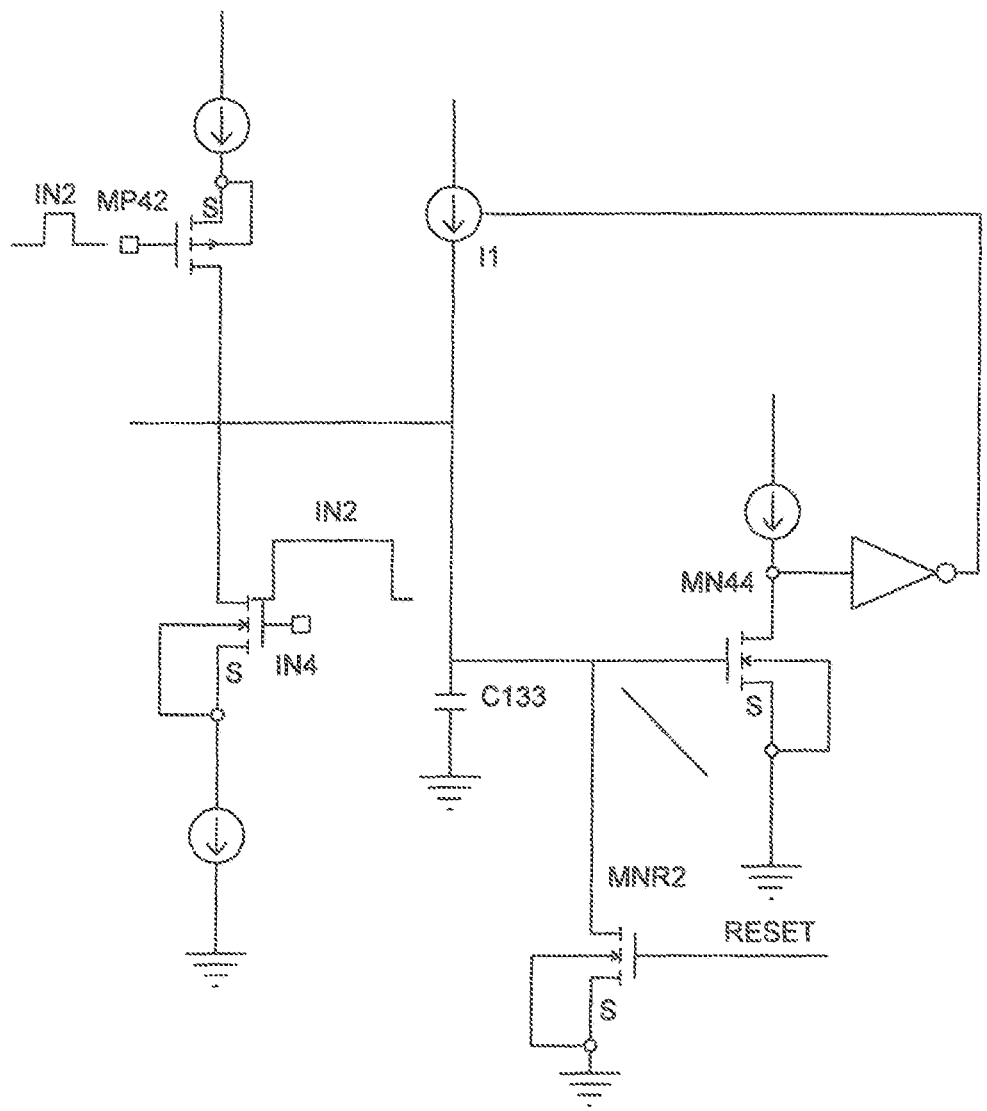
FIG. 24 shows an example of weighted inputs where charge may be added or removed to implement a subtract function.

We will now illustrate specifically a backpropagation algorithm implemented using the described charge domain methods. Note that with respect to the circuits described in FIG. 22 and FIG. 23, although we only show n-channel switch and current source arrangements which add to the pulse width, we can also couple gated p-channel switch and series current source arrangements that would reduce the output pulse width as shown in FIG. 24. We start at the input with an input training set $a^1$ and propagate forward using circuits similar to FIG. 23 (neuron cell) and record in circuits similar to that shown in FIG. 22 (memory cell), except there will be only one input to the cell and its weight will be 1 (identical to the upper current source 140) which when multiplied by the input pulse will store the value for each activation. As a secondary operation we will add a small charge which will be used as the $\Delta z$ perturbation and will record the $\sigma(z_j + \Delta z_j)$ value which will be used to determine $\sigma'(z_j^1)$. As we will soon illustrate, it is necessary to have this information as a current source weight if we are to multiply it against a pulse input. We therefore need to generate the equivalent of a single input FIG. 22 memory cell (MDLL) with the weighted current source producing a pulse on the memory cell output equal to that stored on the original $\sigma'(z_j^1)$ memory cell when the input pulse value coupled to the input current source gating the mosfet in series with the current source is of maximal value (full pulse corresponding to a 1). We can do this with a delay lock loop which adjusts the current source magnitude of the current source in the MDLL to lock the pulse width from said memory cell to the memory cell saving the pulse information from the the original $\sigma'(z_1^3)$. A DLL is well known to those skilled in the art and there are many efficient architectures for quickly locking a pulse magnitude by adjusting a parameter such as the current source value. These values will therefore be stored as currents using a circuit similar to that shown in FIG. 13.

After loading each activation we do not enable the output pulse but just store all of the results in separate memory cells. Next, we move to the the output and compute $(a_1^3 - y_1)\sigma'(z_1^3)$. Firstly, we will load our target $y_1$ into the circuit shown in FIG. 22, except there will be only one input to the cell and its weight will be 1 (identical to the upper current source). After loading $y_1$ we do not enable the read out pulse. We have already loaded $a_1^3$ into a memory cell so we now couple the output of $y_1$ to a complimentary input (see FIG. 24) of the $a_1^3$ memory cell and enable the output of the $y_1$ to perform the subtraction $(a_1^3 - y_1)$. Using the same method we subtract $a_1^3$ from the previously stored $\sigma(z_1^3 + \Delta z_1^3)$ and store the resulting $\sigma'(z_1^3)$ in a memory cell. We then use a MDLL to convert $\sigma'(z_1^3)$ from a pulse memory input to a current source memory input and use this current to calculate $\delta^{x,L}$.

Once we have the output layer $\delta^{x,L}$ computed in this way we multiply the output layer $\delta^{x,L}$ by the incoming weights and then by $\sigma'(z^{x,l})$. Specifically, $\delta^{x,l} = ((w^{l+1})^T \delta^{x,l+1}) \odot \sigma'(z^{x,l})$. The first multiply $((w^{l+1})^T \delta^{x,l+1})$ is easy since we simply use the weights and the just created $\delta^{x,L}$ pulse as an input to construct the next value. Assuming we used our memory cell to generate $((w^{l+1})^T \delta^{x,l+1})$ by introducing $\delta^{x,l+1}$ as an input pulse and the weights in their original current source form we can now couple the output pulse to another memory cell where the current source was adjusted using the delay lock loop technique to produce a current input to match the memory cell which stored value of $\sigma'(z^{x,l})$ which we stored earlier. In this way we can generate our error contour $\delta^{x,l}$ and store it on memory cells.

Now we can finally start our gradient decent. We learned that we should update as follows: The weights $$w^l \rightarrow w^l - \frac{n}{m} \sum_x (\delta^{x,l} a^{x,l-1})^T$$

and the biases according to the rule $$b^l \rightarrow b^l - \frac{n}{m}\sum_x \delta^{x,l},$$

where n is the number of training examples, m the number of mini-batches and x the present training sample. We have already generated $\delta^{x,l}$ and $a^{x,l-1}$ for a single set of samples (each x). We will need to multiply those terms so it will be necessary to convert $a^{x,l-1}$ from our pulse output memory cell to a current using a MDLL but we are not going to do that quite yet. First it would be better to store $\delta^{x,l}$ and $a^{x,l-1}$ over our dataset x in our memory cell. We already know how many training examples n and how many minibatches m we are using and therefore know n/m. We are going to use a multiplier where instead of the current source in series with S0 in FIG. 22 being proportional to the input weight current sources such that a full pulse input would produce the same output pulse, we scale the S0 current sources by n/m to build in that scaling factor. Next for each weight, $w^l$, we will use a local DLL to develop a memory cell with a current source equivalent of $a^{x,l-1}$ as described above. Now we can use our modified memory cell to output a weight adjustment which will be applied using the method in FIGS. 13 and 14 where the magnitude of the pulse we subtract are the values we just calculated all summed together across all of x using another weighted summer, i.e.

$$\frac{n}{m}\sum_x (\delta^{x,l} a^{x,l-1}).$$

The result will be an adjustment of the weight $$w^l \rightarrow w^l - \frac{n}{m}\sum_x (\delta^{x,l} a^{x,l-1}).$$

Similarly, we will adjust the biases using the same method according to $$b^l \rightarrow b^l - \frac{n}{m}\sum_x \delta^{x,l}$$

except the biases are easier to adjust since we do not have to do a DLL and multiply and simply need to use a weighted summer for each $\delta^{x,l}$.

The above switched charge charge domain circuitry, accepting weighted charge inputs rather than voltage inputs, produces several distinct advantages compared with switched capacitor circuits. Firstly, it is easier to transmit input information as a time pulse which when gating a current source representing weights produces a weighted charge input. Additionally, we can accept an arbitrary number of such weighted inputs asynchronously. The gate of the common source MOSFET acts as a memory. The noise of the circuit is a fraction of that of a similar switched capacitor circuit since the noise bandwidth is modified by the extremely small conduction time relative to the half period used in a switched capacitor circuit. By accepting charge there is no requirement to trim capacitors as there would be in a switched capacitor circuit accepting voltage. There is no operational amplifier and resulting noise and settling time, as such the system is much faster and propagation time is dependent upon component values. It is scalable into smaller lithography processes since it does not rely on analog circuitry such as the aforementioned analog operational amplifier. Switched charge based decision circuits and other neural network building blocks can easily be created using similar means and time based mathematics used to easily implement a result. The common source multiplier approach implements correlated double sampling (CDS) which removes flicker noise, offsets, and temperature or process variations or leakage variations.

In some instances, it may be useful to improve the accuracy of the currents holding the weights or the accuracy of input values. It is known to those skilled in the art the a ΣΔ modulator allows improvement in accuracy by oversampling the Δ of a quantizer output vs an input value, filtering that result with gain and modifying the quantizer output in conformance with said filter output over multiple cycles. The value over multiple cycles and averaged result will be of an accuracy improved in proportion to gain and oversampling ratio.

Figure 18:
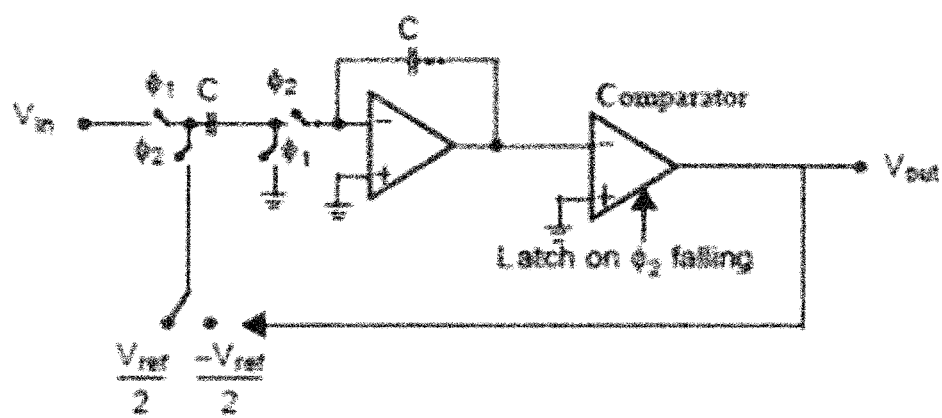
FIG. 18 is a block diagram showing an exemplary embodiment of a ΔΣ MOD 1 converter in accordance with one aspect of the present application.

This concept may be shown in FIGS. 18-21. In FIG. 18, the concept of a ΣΔ mod 1 modulator 100 (hereinafter modulator 100) is shown. This modulator works by taking the Δ of a quantizer output and an input value to match, using an integrator as a filter driving said single bit quantizer. In this case the quantizer applies it output by moving the switched capacitor reference around ground. The resulting bitstream will average to the desired input value.

Figure 19:
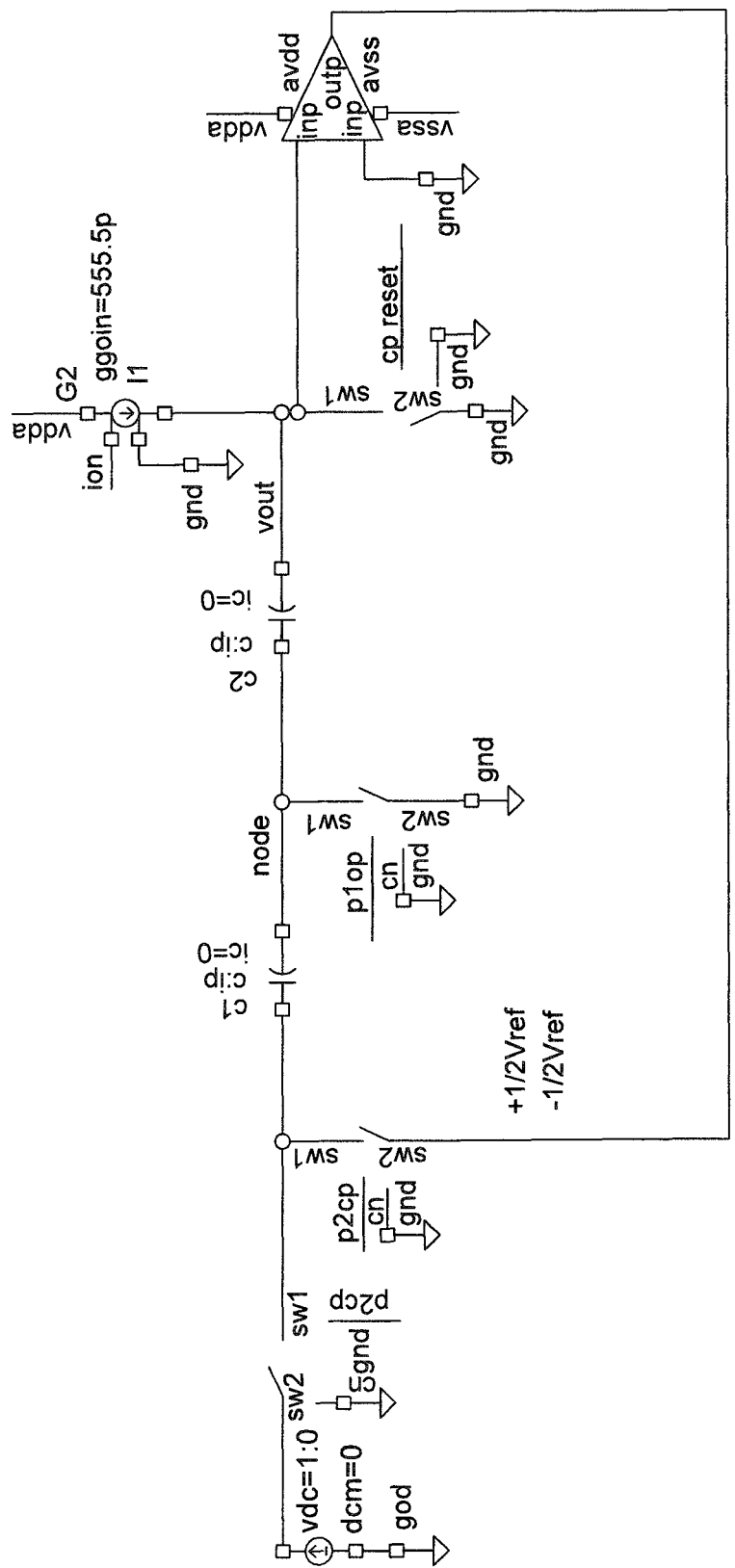
FIG. 19 is a block diagram showing an exemplary embodiment of a ZCELL as a MOD 1 ΔΣ feedback in accordance with one aspect of the present application.
Figure 20:
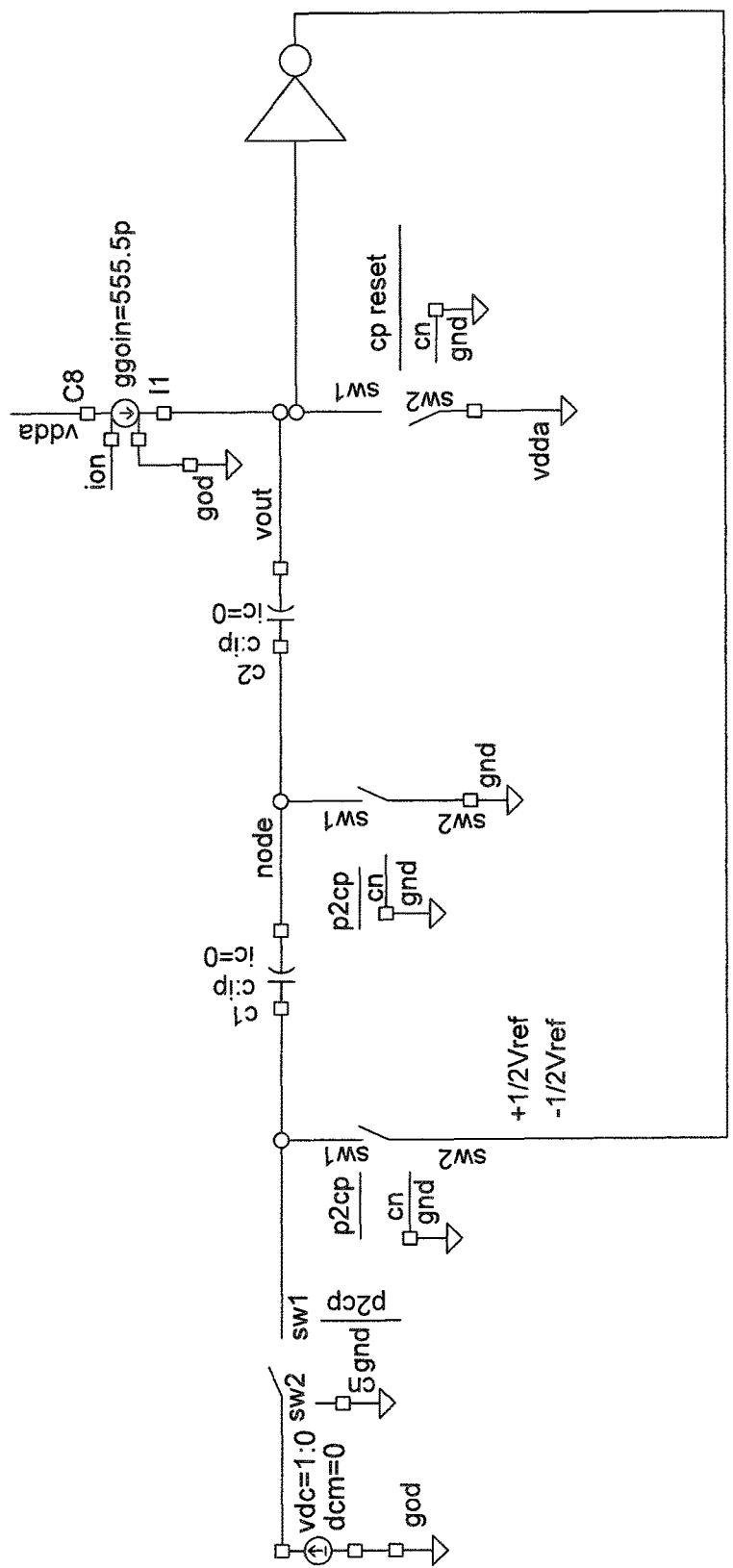
FIG. 20 is a block diagram showing an exemplary embodiment of a ZCELL as a MOD 1 ΔΣ feedback with inverter in accordance with one aspect of the present application.
Figure 21:
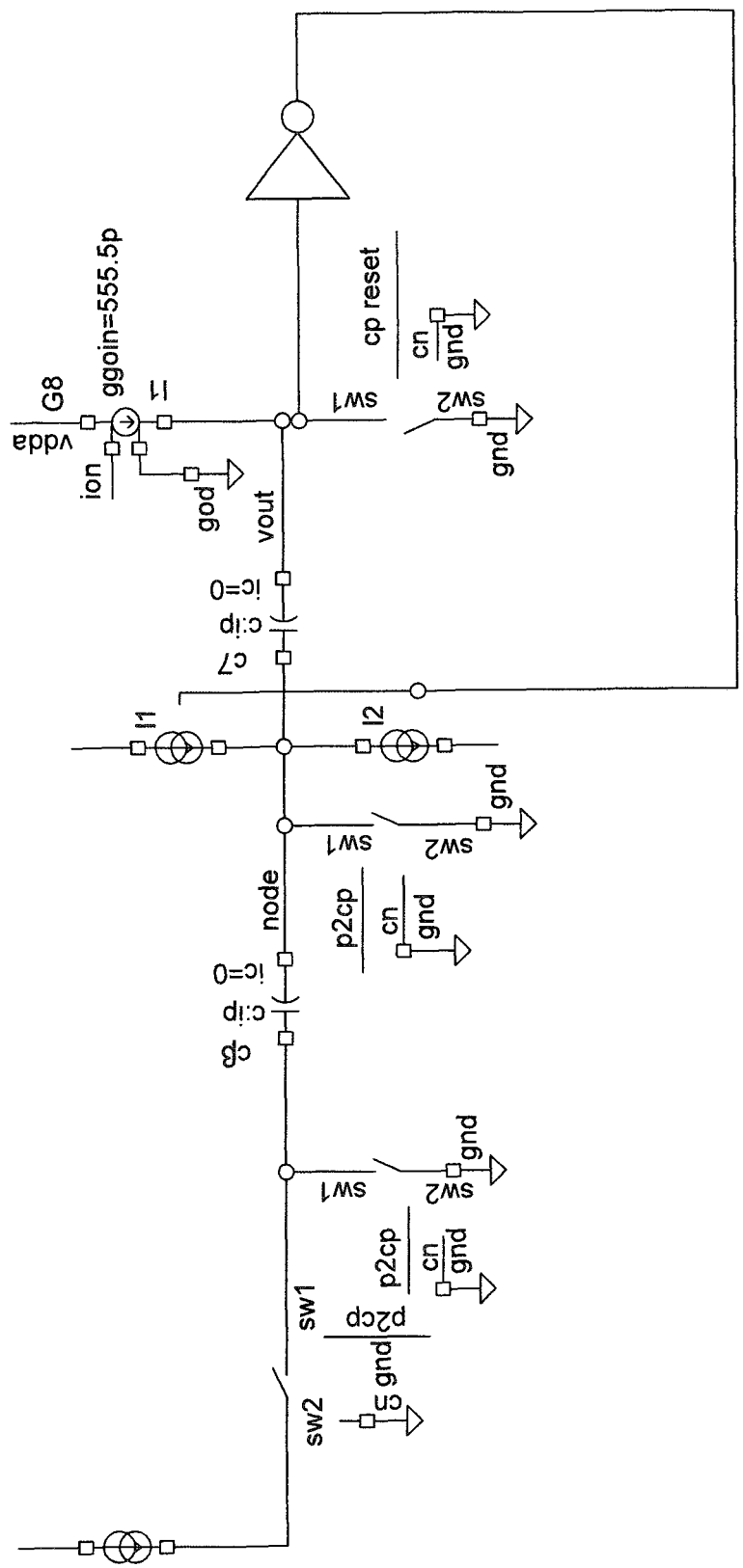
FIG. 21 is a block diagram showing an exemplary embodiment of a ZCELL as a MOD 1 ΔΣ current mode feedback in accordance with one aspect of the present application.

The modulator 100 is a switched capacitor integrator with a digital reference fed to the one side of the input capacitor C. FIG. 19 shows a comparator based version of the modulator 100 shown in FIG. 18. FIG. 20 shows how an inverter with level shift ("inverter configuration") could be used to replace the comparator (although it may be necessary to provide more filter gain) provided the inverter contains a level shift which allows operation around ground similar to the comparator. Finally, FIG. 21 shows a charge or current based version of the modulator where the input is a charge input and the charge is adjusted against gated currents rather than voltages. This circuit will produce a continuous waveform around the input value which will average over multiple cycles to the input value. It is known to those skilled in the art that this technique may utilize higher order filters, more gain, and higher order quantizers to achieve high levels of accuracy. Additionally, it may be applied over the entire neural network operation such that the output of the neural network is considered a multiple cycle average. Alternatively it could be applied only locally such as to a control register which maintains a current weight input or to match a pulse input.

Factory loading and calibration of a neural network system can take significant time due to the large number of weights and biases that need to be loaded into a large network. By integrating the neural network into a pixel array and providing local charge domain memory one has an opportunity to parallel load the data very quickly, saving time and cost during factory calibration or during learning situations. Specifically, if a test fixture is developed which provides pixel data corresponding to the data that one wishes to load, then one can load in parallel as many weights or biases as there are pixels. For example, a 12M pixel array could parallel load 12M pieces of information. With a sub-1 us charge accumulation time this means that it is possible to load 12M*1e6=12e12 or 12 terabytes of data per second. At an assumed accuracy of 14 bits this is equivalent to loading at a rate of 12*12=144 terabits of data per second which is difficult to match using other means. Target data may be loaded in a similar way.

The data can then be parallel stored in non-volatile memory located in each neuron without burdening the parallel loading system.

While embodiments of the disclosure have been described in terms of various specific embodiments, those skilled in the art will recognize that the embodiments of the disclosure may be practiced with modifications within the spirit and scope of the claims

What is claimed is:

1. A neural network error contour generation mechanism comprising a device which perturbs analog neurons to measure an error which results from perturbations at different points within the neural network, wherein the device comprises:
    a neuron summer circuit to integrate a perturbation formed of weighted and biased inputs of an error function;
    an analog circuit coupled to the neuron summer sampling and holding an activation result of the perturbation to calculate $\sigma'(z)$ defined as a difference between the activation result and the perturbation; and
    a multiplier circuit multiplying $\sigma'(z)$ by a curl of a cost function to generate output layer errors.

2. The neural network error contour generation mechanism of claim 1, wherein the neurons are comprised of one or more of: switched charge multipliers, division and current mode summations circuits, and decision circuits.

3. The neural network error contour generation mechanism of claim 1, comprising means for generating errors for layers below an output layer by using one of switched charge multipliers or division and current mode summations circuits to generate error values by backpropagation through the layers.

4. The neural network error contour generation mechanism of claim 1, wherein the error caused by a perturbation at each weighted input to a neuron is measured at a respective output of the neural network.

5. The neural network error contour generation mechanism of claim 1, comprising a neural network update circuit modifying analog weight values to direct the neural network error contour generation mechanism towards a target in response to an error contour generated.

6. The neural network error contour generation mechanism of claim 4, comprising a neural network update circuit modifying analog weight values to direct the neural network error contour generation mechanism towards a target in response to an error contour generated.

7. The neural network error contour generation mechanism of claim 1, wherein an error contour generated is stored in an analog memory.

8. The neural network error contour generation mechanism of claim 6, wherein the error contour generated is stored in an analog memory.

9. The neural network error contour generation mechanism of claim 1, comprising a circuit modifying analog bias values to direct the neural network error contour generation mechanism towards a target.

10. The neural network error contour generation mechanism of claim 1, wherein the error is a quadratic difference.

* * * * *